Patented Aug. 13, 1929.

1,724,376

UNITED STATES PATENT OFFICE.

HERMAN SCHREIBER, OF LANSING, MICHIGAN.

PROCESS OF PURIFYING RAW SUGAR JUICES.

No Drawing. Application filed May 21, 1928. Serial No. 279,625.

This invention relates to processes of refining or purifying raw sugar juices and it comprises a process in which raw sugar juice, as initially obtained from sugar containing material, is maintained at a moderately elevated temperature but one substantially below the boiling point of the sugar juice, with or without the addition of reagents, until a "break" occurs, thereafter the somewhat purified juice is separated from the non-sugar substances thrown out of solution or suspension, and the juice finally treated with lime and heated until a clear, purified juice is obtained.

Numerous methods have been proposed, having for their object the purification of raw sugar juice, to remove non-sugars such as suspended matter, color, colloidal constituents, waxes and the like, all of which deleteriously affect the quantity of sugar ultimately obtained and likewise its quality.

Economic considerations in this art are of first importance. While it is possible to substantially purify raw sugar juices so that the ultimate sugar obtained is of very high quality, nevertheless the additional cost of such purification steps hitherto proposed, renders their application prohibitive in many instances. It follows that the most desirable process for purifying raw sugar juices must not only satisfactorily purify the juices but also do this at a minimum expense. Hitherto the sugar manufacturer has been forced to strike a balance between purity and cost of production.

In one of the customary ways at present employed, the raw sugar juice, crushed from the whole cane stripped of leaves, is treated with a small amount of milk of lime (about 6/10 lbs. CaO per ton cane in Cuba) and brought to a boil. It is then allowed to settle and the clear juice, forming the middle layer between a blanket of scum and a precipitate of mud, is drawn off intermittently or by continuous settling devices, known as clarifiers. This clarified thin juice is evaporated to a syrup which is then boiled to grain and the sugar centrifuged out. The final molasses is the residual material after several boilings to grain.

The juice of the cane expressed by the rolls of the mills is turbid and gray and contains fine particles of solids, small particles of the cane (bagacillo, earth, and wax) which have not been removed by the strainers. The solid material of the cane contains cellulose, hemicellulose, pentosans, a little fat, some wax, and the earth adhering to the cane. The juice contains sucrose, reducing sugars, acids, and the protoplasmic constituents of plant cells among which are proteolytic enzymes.

Before the juice is fit for the satisfactory crystallization of sugar it must be cleansed of as much of the non-sugar as possible. Treating the juice with an alkali such as lime effects a separation into a mud and a more or less clear liquor, the clarified or defecated juice. The alkali acting on the non-sugars in the juice brings into solution some of these materials, adding to the impurity of the solution which is rarely entirely clear and brilliant and which always retains some of the solids in suspension. The alkali acting on the humus of the soil adhering to the cane and thus entering the juice tends to darken the color of the solution as humus is soluble in alkali. The result of these disadvantages is evident in the resultant sugar.

From the above brief description of one of the customary methods at present employed, it will be apparent that the purification of raw sugar juices is not at all a simple matter. Slight changes in a particular way of proceeding sometimes leads to unexpectedly great advantages and the present state of the art is almost wholly empirical.

According to the process of the present invention the purification of the raw sugar juices, that is, the removal of non-sugars contained therein can be easily accomplished with a minimum of expense measured in time, labor, chemical reagents used and heat consumption, and the resulting purified juices given a high coefficient of purity. My process is characterized by maintaining the raw juices, in the presence or absence of added reagents, at a moderately elevated temperature but one which is substantially below the boiling point of the juices and is usually not higher than 80° C. During this heat treatment of the juices, I find that much of the non-sugar material, such as fine particles of bagacillo, earthy substances and the like both precipitate and form a scum on the surface of the juices. Furthermore, some of the colloidal impurities, such as the albumins, coagulate and either precipitate or form a surface layer or scum. There is a very real advantage in maintaining the solution at an elevated temperature but a temperature which is considerably below the boiling point of the juices. At the boiling point, there is a tendency for the colloidal substances, more especially those of cellular character, to form soluble cellular materials such as hemicellulose and the like which will actually dissolve in the sugar juice. This is of course a great disadvantage and is avoided in my way of proceeding.

Furthermore, present knowledge indicates that raw sugar juices contain naturally occurring proteolytic enzymes, they being extracted from the plant substance of the sugar cane. In my process, I put these substances to use by working at temperatures below those at which the proteolytic enzymes are destroyed. Under the temperature conditions employed in my process, the proteolytic enzymes derived from the cane function to break down the albumins and proteins in the raw sugar juice to substances of lower molecular weight which do not inhibit crystallization. These naturally occurring enzymes are readily destroyed at temperatures much in excess of 80° C. and from 90° C. up to boiling temperature and above, the enzyme action is wholly inhibited.

During this step I can advantageously add to the sugar juices substances which will tend to assist in the precipitation of non-sugars, colloidal matter, finely divided suspended impurities and soluble inorganic salts derived in the extraction of the juices. Such addition substances, which I choose to define as "precipitants" can be chosen from a large group of substances. Salts, acids, bases or enzymes such as calcium chloride, milk of lime, hydrochloric acid, and pepsin or certain other proteolytic enzymes are effective for this purpose. The quantity of addition agents, or precipitants, added is comparatively small. Their function is not a priori to modify or greatly change the hydrogen ion concentration of the juice. Their function is primarily to facilitate the initial removal of non-sugars.

While the raw juice is kept at a moderately elevated temperature, it slowly "breaks" or separates into three layers, a top layer of scum, a middle opalescent layer of juice and a bottom layer of so-called "mud." The middle layer is substantially free of suspended matter and much of the colloidal matter and non-sugars with which the raw juice was contaminated.

I then decant or syphon off or otherwise remove the opalescent or cloudy juice and conduct it to a second treating tank.

To the juices in the second tank, I now add lime, advantageously in the form of milk of lime. The quantity of lime added may or may not be sufficient to give the juices an alkaline reaction but is sufficient to adjust the hydrogen ion concentration to that desired by the operator as seems best with reference to the raw material undergoing treatment. The hydrogen ion concentration can vary from 6.5 to 8 or more and ultimately depends upon the character of the juices treated and the preferences of the operator.

The limed juices are then heated to a temperature equal to or higher than the temperature at which the raw juices were previously maintained, as described above, and are kept at this temperature until a clear brilliant solution results. Usually I heat in the second step to a temperature of 70 to 100° C. While I can boil the sugar solution in this heating step, I find it usually better not to heat the sugar juice high enough to cause ebullition. The length of time during which I maintain the limed solution hot is advantageously from 40 to 90 minutes although the exact length of time depends upon the character of the raw sugar juice being treated. The completion of this heating step is readily determined by the experienced sugar operator, usually by observing the appearance of the juice.

After this second heating operation, I then separate the clear brilliant juices from any separated non-sugars and advantageously pass the juices directly to the evaporators.

In comparison with processes at present in use, I find that my process is more economical because I normally avoid high temperatures and thus realize a saving in fuel charges and furthermore the coefficient of purity of the finished juice is somewhat higher than that obtained by processes customarily employed. That is, if a particular raw sugar juice is refined by the straight liming process I have earlier described as being indicative of present sugar house practice, the coefficient of purity, in the finished juice, may amount to 82 per cent. Treating the same raw sugar juice by my process, I find that the coefficient of purity increases to about 83 per cent. An increase of about 1 per cent in the coefficient of purity represents a considerable increase in production and decrease in cost.

As a specific example of the way in which my process is carried out, I preheat a ton of raw sugar juice, having a purity coefficient of, for example 81 per cent, to a temperature between 50° and 60° C., if the raw juice as obtained is below these temperatures and maintain the heated juice at this temperature for 35 to 50 minutes. At the conclusion of this time, the sugar juice will form a middle layer, a precipitate of mud being on the bottom and a compact layer or scum at the top. The almost clear opalescent layer of juice is decanted into a second tank and to it I add about 0.6 lbs. of lime and heat to a temperature between 70 and 100°

C., say 80° C. I hold the limed juice at this temperature for from 40 to 90 minutes or until a clear brilliant liquid is obtained. I then separate the clear liquid from such non-sugars as have separated out and advantageously run the juice to the evaporators. Whereas the coefficient of purity in the raw or virgin juice was about 81 percent, I find as a result of my process that the coefficient has increased to about 82 percent.

As a second specific way of proceeding, I add to a ton of raw sugar juice about 0.02 percent calcium chloride and then heat to a temperature of about 55° C. maintaining the juice at this temperature until the separation of solid material is complete under the conditions. I then decant and heat the opalescent juice to a temperature of about 80° C. in the presence of a small amount of added lime, say 0.6 lbs. as in the preceding example.

Instead of calcium chloride, I can use about 0.003 per cent of calcium hydroxide in the preheating step and it is to be noted that this quantity is considerably less than that required to neutralize the juices. Or I can add about 0.01 percent of hydrochloric acid depending upon the character of the juice I am treating. It is also advantageous to add a very small amount of pepsin or rennin or other proteolytic enzyme having the property of breaking down or precipitating the protein matter in the juices. About 1 lb. of pepsin dissolved in calcium chloride solution to 40 tons of juice is a convenient proportion to use. If the character of the juice to be treated indicates it, one or more of the above set forth "precipitants" can be added.

While I have indicated various ways of carrying out my process, it is of course obvious that numerous modifications thereof may be employed without departing from the essential features of my invention. It is to be expected that the skilled sugar worker will preliminarily test a small quantity of the sugar juice to be treated in order to determine the particular modification best suited to the particular juice. For instance, the experienced sugar worker will subject a small batch of juice to a preliminary preheating step in the presence of one or several of the above mentioned auxiliary agents or precipitants in order to determine the one best suited to the juice to be treated. Similarly variations in the temperatures and time of heating will be made in order that the conditions under which the process is carried out will best fit the particular juice undergoing treatment. For instance, I do not find its absolutely essential that the second heating step be carried out at the temperatures indicated. In this step, the limed sugar juice can be brought to a boil or even heated to a temperature in excess of the boiling point.

By the term "precipitant," in the appended claims, I mean to include in general such substances which when added to a sugar juice containing non-sugars, such as finely divided suspended matter, colloidal material, proteins and the like, will assist, and possibly accelerate, the removal of such non-sugars from the juice, either in the form of a precipitate or a floating scum, or both.

What I claim is:

1. The process of purifying raw sugar juices which includes maintaining the raw juices at a moderately elevated temperature but substantially below the boiling point of the juices until no further separation of non-sugars occurs, separating the juices from the non-sugars thrown out of solution or suspension, adding lime to the juices to adjust the hydrogen ion concentration, and heating the limed juices until a clear liquid results.

2. The process of purifying raw sugar juices which includes maintaining the raw juices at a moderately elevated temperature but not exceeding 80° C. until no further separation of non-sugars occurs, separating the juices from the non-sugars thrown out of solution or suspension, adding lime to the juices to adjust the hydrogen ion concentration, and heating the limed juices until a clear solution results.

3. The process of purifying raw sugar juices which includes maintaining the raw juices at a moderately elevated temperature but substantially below the boiling point of the juices until no further separation of non-sugars occurs, separating the juices from the non-sugars thrown out of solution or suspension, adding lime to the juices to adjust the hydrogen ion concentration, and heating the limed juices to, and keeping them at, a temperature at least equal to that at which the raw juices were maintained until a clear liquid results.

4. The process of purifying raw sugar juices which includes maintaining the raw juices at a moderately elevated temperature but not exceeding 80° C. until no further separation of non-sugars occurs, separating the juices from the non-sugars thrown out of solution or suspension, adding lime to the juices to adjust the hydrogen ion concentration, and heating the juices to, and keeping them at, a temperature at least equal to that at which the raw juices were maintained until a clear solution results.

5. The process of purifying raw sugar juices which includes maintaining the raw juices containing an added precipitant at a moderately elevated temperature but substantially below the boiling point of the juices until no further separation of non-sugars occurs, separating the juices from the non-sugars thrown out of solution or suspension, adding lime to the juices to adjust the hydrogen ion concentration, and heating the juices to, and keeping them at, a temperature at least equal to that at which the raw juices were maintained until a clear liquid results.

6. The process of purifying raw sugar juices which includes maintaining the raw juices containing an added precipitant at a moderately elevated temperature but not exceeding 80° C. until no further separation of non-sugars occurs, separating the juices from the non-sugars thrown out of solution or suspension, adding lime to the juices to adjust the hydrogen ion concentration, and heating the limed juices to, and keeping them at, a temperature at least equal to that at which the raw juices were maintained until a clear liquid results.

7. The process of purifying raw sugar juices which includes maintaining the raw juices containing an added precipitant at a moderately elevated temperature but substantially below the boiling point of the juices until no further separation of non-sugars occurs, separating the juices from the non-sugars thrown out of solution or suspension, adding lime to the juices to adjust the hydrogen ion concentration, and heating the limed juices until a clear liquid results.

8. The process of purifying raw sugar juices which includes maintaining the raw juices containing an added precipitant at a moderately elevated temperature but not exceeding 80° C. until no further separation of non-sugars occurs, separating the juices from the non-sugars thrown out of solution or suspension, adding lime to the juices to adjust the hydrogen ion concentration, and heating the limed juices until a clear solution results.

9. The process of purifying raw sugar juices which includes maintaining the raw juices at a moderately elevated temperature but not exceeding 80° C. until no further separation of non-sugars occurs, separating the juices from the non-sugars thrown out of solution or suspension, adding lime to the juices to adjust the hydrogen ion concentration, and heating the limed juices to, and keeping them at, a temperature at least equal to that at which the raw juices were maintained but not substantially exceeding 100° C. until a clear liquid results.

10. The process of purifying raw sugar juices which includes maintaining the raw juices containing an added precipitant at a moderately elevated temperature but not exceeding 80° C. until no further separation of non-sugars occurs, separating the juices from the non-sugars thrown out of solution or suspension, adding lime to the juices to adjust the hydrogen ion concentration, and heating the limed juices to, and keeping them at, a temperature at least to that at which the raw juices were maintained but not substantially exceeding 100° C. until a clear solution results.

11. As a preliminary step in the process of freeing raw sugar juices from the non-sugar substances contained therein, the steps which include maintaining the raw sugar juices substantially as such at a moderately elevated temperature but substantially below the boiling point of the juices until no further separation of non-sugars occurs and then separating the juices from the non-sugars thrown out of solution or suspension prior to further purification.

12. As a preliminary step in the process of freeing raw sugar juices from non-sugar substances contained therein, the steps which include maintaining the raw sugar juices substantially as such at a moderately elevated temperature but not exceeding 80° C. until no further separation of non-sugars occurs and then separating the juices from the non-sugars thrown out of solution or suspension prior to further purification.

13. As a preliminary step in the process of freeing raw sugar juices from non-sugar substances contained therein, the steps which include maintaining the raw sugar juices substantially as such, but containing an added precipitant, at a moderately elevated temperature but substantially below the boiling point of the juices until no further separation of non-sugars occurs and then separating the juices from the non-sugars thrown out of solution or suspension prior to further purification.

14. As a preliminary step in the process of freeing raw sugar juices from non-sugar substances contained therein, the steps which include maintaining the raw sugar juices substantially as such, but containing an added precipitant, at a moderately elevated temperature but not exceeding 80° C. until no further separation of non-sugars occurs and then separating the juices from the non-sugars thrown out of solution or suspension prior to further purification.

15. The process of purifying raw sugar juices which includes maintaining the raw juices substantially as such at a moderately elevated temperature but substantially below the boiling point of the juices until no further separation of non-sugars occurs, separating the juices from the non-sugars thrown out of solution or suspension, and thereafter treating the juices to further free them from non-sugars contained therein until a clear brilliant sugar juice is obtained.

16. The process of purifying raw sugar juices which includes maintaining the raw juices substantially as such at a moderately elevated temperature but not exceeding 80° C. until no further separation of non-sugars occurs, separating the juices from the non-sugars thrown out of solution or suspension, and thereafter treating the juices to further free them from non-sugars contained therein until a clear brilliant sugar juice is obtained.

17. The process of purifying raw sugar juices which includes maintaining the raw juices substantially as such, but containing an added precipitant, at a moderately elevated temperature but substantially below the boiling point of the juices until no further separation of non-sugars occurs, separating the juices from the non-sugars thrown out of solution or suspension, and thereafter treating the juices to further free them from non-sugars contained therein until a clear brilliant sugar juice is obtained.

18. The process of purifying raw sugar juices which includes maintaining the raw juices substantially as such, but containing an added precipitant, at a moderately elevated temperature but not exceeding 80° C. until no further separation of non-sugars occurs, separating the juices from the non-sugars thrown out of solution or suspension, and thereafter treating the juices to further free them from non-sugars contained therein until a clear brilliant sugar juice is obtained.

In testimony whereof I affix my signature.

HERMAN SCHREIBER.